(12) United States Patent
Decker

(10) Patent No.: US 10,268,102 B2
(45) Date of Patent: Apr. 23, 2019

(54) UNIVERSAL PROTECTIVE CAP FOR CAMERA LENSES AND OTHER TUBULAR-SHAPED OBJECTS

(71) Applicant: Cary Allen Decker, Provo, UT (US)

(72) Inventor: Cary Allen Decker, Provo, UT (US)

(*) Notice: Subject to any disclaimer, the term of this patent is extended or adjusted under 35 U.S.C. 154(b) by 0 days.

(21) Appl. No.: 15/936,287

(22) Filed: Mar. 26, 2018

(65) Prior Publication Data

US 2019/0056638 A1 Feb. 21, 2019

Related U.S. Application Data

(60) Provisional application No. 62/546,061, filed on Aug. 16, 2017.

(51) Int. Cl.
| | |
|---|---|
| *G02B 7/10* | (2006.01) |
| *G03B 11/04* | (2006.01) |
| *G03B 15/00* | (2006.01) |
| *G03B 15/06* | (2006.01) |
| *G03B 17/00* | (2006.01) |
| *G03B 17/02* | (2006.01) |
| *G03B 17/04* | (2006.01) |
| *G03B 17/24* | (2006.01) |

(Continued)

(52) U.S. Cl.
CPC ............ *G03B 11/041* (2013.01); *F16M 11/08* (2013.01); *F16M 11/2021* (2013.01); *G03B 15/00* (2013.01); *G03B 15/06* (2013.01); *G03B 17/00* (2013.01); *G03B 17/02* (2013.01); *G03B 17/04* (2013.01); *G03B 17/24* (2013.01)

(58) Field of Classification Search
CPC ....................................................... G03B 17/04
USPC ........................................................... 396/448
See application file for complete search history.

(56) References Cited

U.S. PATENT DOCUMENTS

| | | | | |
|---|---|---|---|---|
| 3,744,528 A | * | 7/1973 | Vestal | B65D 59/06 138/89 |
| 4,538,741 A | * | 9/1985 | Jacobs | B65D 41/22 215/320 |

(Continued)

OTHER PUBLICATIONS

KUVRD, 'Universal Lens Cap', www.kickstarter.com/projects/kuvrd/kuvrd-universal-lens-cap, KUVRD, Dec. 16, 2017, 33 pages.*

(Continued)

*Primary Examiner* — Clayton E. LaBalle
*Assistant Examiner* — Kevin C Butler
(74) *Attorney, Agent, or Firm* — Brett J. Davis

(57) ABSTRACT

A removable and flexible protective cap that is configured and dimensioned to stretch and slip over fixed camera lenses, detachable camera lenses and other tubular-shaped objects. The protective cap fits on objects having different diameters. The protective cap further includes integrated bumpers to provide improved protection against impacts. The protective cap has a memory such that when it is removed from a lens, it returns to its original shape. The protective cap may include a lint-resistant feature to prevent lint and dust from adhering to the cap. The protective cap is particularly suited for lenses used in photography, videography, hunting, military, and astronomy. The protective cap is also suited for use on non-optical devices, including gun barrels. In addition, the protective cap is suitable for use on other tubular-shaped objects.

31 Claims, 8 Drawing Sheets

(51) Int. Cl.
*F16M 11/08* (2006.01)
*F16M 11/20* (2006.01)

(56) References Cited

U.S. PATENT DOCUMENTS

| | | | | |
|---|---|---|---|---|
| 4,697,890 | A * | 10/1987 | Crookston | F21L 15/04 359/489.14 |
| 6,247,855 | B1 * | 6/2001 | Motohashi | G03B 17/02 396/448 |
| 7,997,809 | B1 * | 8/2011 | Lee | G03B 11/041 396/448 |
| 8,292,523 | B2 * | 10/2012 | Dowell | G03B 11/041 359/511 |
| 2006/0169693 | A1 * | 8/2006 | Yeung | B65D 43/0222 220/287 |
| 2009/0002823 | A1 * | 1/2009 | Law | G03B 11/06 359/511 |
| 2009/0086101 | A1 * | 4/2009 | Lee | G03B 11/06 348/655 |
| 2010/0027120 | A1 * | 2/2010 | Elowitz | G03B 11/041 359/511 |
| 2010/0226642 | A1 * | 9/2010 | Hirabayashi | G03B 17/00 396/448 |
| 2011/0249335 | A1 * | 10/2011 | Strawderman | G02B 23/16 359/511 |
| 2011/0284566 | A1 * | 11/2011 | Segal | B65D 41/22 220/796 |
| 2012/0218760 | A1 * | 8/2012 | Nagaoka | F21V 17/12 362/249.02 |
| 2012/0318815 | A1 * | 12/2012 | Kooney | B65D 43/0212 220/780 |
| 2013/0129338 | A1 * | 5/2013 | Dowell | G03B 11/041 396/448 |
| 2015/0226960 | A1 * | 8/2015 | Cheng | G02B 27/0006 359/511 |

OTHER PUBLICATIONS

International Search Report & Written Opinion of the ISA for PCT/US/024380.

* cited by examiner

UNIVERSAL PROTECTIVE CAP FOR CAMERA LENSES AND OTHER TUBULAR-SHAPED OBJECTS

CROSS-REFERENCE TO RELATED APPLICATIONS

This application claims the benefit of U.S. Provisional Patent Application No. 62/546,061 filed on Aug. 16, 2017 and entitled UNIVERSAL LENS CAP; which application is hereby incorporated by reference in its entirety herein.

STATEMENT REGARDING FEDERALLY SPONSORED RESEARCH OR DEVELOPMENT

Not Applicable.

BACKGROUND OF THE INVENTION

1. The Field of the Invention

The present invention relates generally to systems for protecting optical devices, and more particularly, but not necessarily entirely, to protective caps for photography and other lenses.

2. Description of Related Art

Traditional lens caps are a bane of professional and amateur photographers. Each sized lens typically requires its own unique lens cap. Traditional lens caps are frequently lost and are difficult to replace. Moreover, traditional lens caps easily break and do not provide adequate protection from shocks and the elements.

It would be an improvement over the prior art to provide a universal lens cap that is capable of fitting most camera lenses. It would be a further improvement to provide a universal lens cap that never falls off and that is waterproof, humidity resistant, lint and dirt repellant, and shock absorbent. It would still be a further improvement to provide a universal lens cap that is easily compressible for storage. It would still be a further improvement to provide a universal lens cap that can be installed onto both fixed and detached lenses. It would still be a further improvement to provide a universal lens cap that can be installed onto both the front and back of a detached lens. It would be still a further improvement to provide a universal lens cap that can be installed on top of another lens cap already installed onto a camera lens to provide an additional layer of protection.

The prior art is thus characterized by several disadvantages that are addressed by the present disclosure. The present disclosure minimizes, and, in some respects, eliminates the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
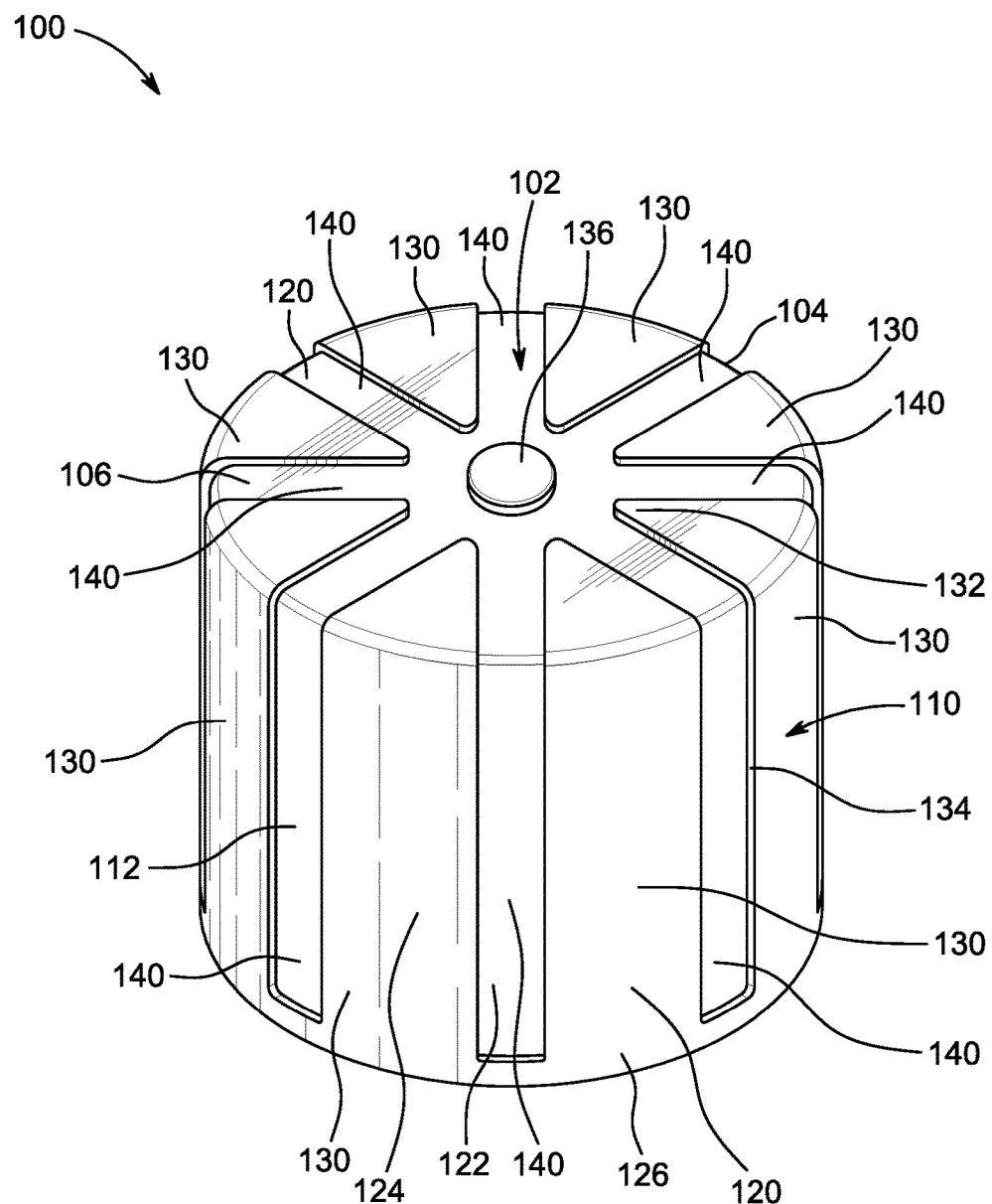
FIG. 1 is a top-down perspective view of a protective cap according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "containing," "characterized by," "having," and grammatical equivalents thereof are inclusive or open-ended terms that do not exclude additional, unrecited elements or method steps. As used herein, the terms "substantially" and "about" take into account that slight variations fall within the scope of the present disclosure.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

It is an objective of the present disclosure to provide a protective cap that is installable onto ends of tubular-shaped objects. In an embodiment, the tubular-shaped object is one of a camera lens, video camera lens, telescope, binocular, gun scopes, gun barrels, and optical devices with substantially tubular housings. In an embodiment, the tubular-shaped object is a tube, such as a cardboard tube, metal tube or plastic tube. Thus, it will be appreciated that the present disclosure provides a protective end cap that is installable onto anything that has a tubular-shaped structure.

It is an objective of the present disclosure to provide a stretchable protective cap made from a flexible material, such as silicone, that is able to be installed on tubular-shaped objects having varying diameters. In this regard, the protective cap may stretch to accommodate tubular-shaped objects having different diameters.

It is an objective of the present disclosure to provide a protective cap for use in photography, where the protective cap may be easily installed on lenses of different diameters and sizes. In this regard, the present invention eliminates the need for photographers to have separately sized lens caps for each of their lenses. Instead, the protective cap disclosed herein is able to fit over most all lenses used in photography, including both detachable and fixed lenses.

It is an objective of the present disclosure to provide a protective cap that provides improved protection for lenses from damage caused by shocks and impacts. In this regard, the present invention covers and protects lenses better than conventional lens caps as it includes a shock absorbent bumpers.

It is an objective of the present disclosure to provide a protective cap that provides improved protection for lenses from damage caused by water and dust. In this regard, when installed, the protective cap may provide waterproof protection to a lens. In addition, the protective cap prevents dust and other debris from damaging the actual lens.

It is an objective of the present disclosure to provide a protective cap that will not fall off a lens under almost any circumstance. In this regard, the protective cap securely engages the barrel of a camera lens by a friction fit. It is further an objective of the present disclosure to provide a protective cap that may be installed onto both the front and rear ends of a camera lens. It is further an objective of the present disclosure to provide a protective cap that stretches to fit lenses having a diameter from about 60 millimeters (mm) to 160 mm. It will be appreciated that the protective cap of the present disclosure may come in different sizes to accommodate a range of lens sizes from 25 mm to 200 mm. For example, a first protective cap may fit onto objects having a diameter from 20 mm to 80 mm, a second protective cap may fit onto objects having a diameter of about 60 mm to 150 mm, a third protective cap may fit onto objects having a diameter of about 105 mm to 200 mm.

It is further an objective of the present disclosure to provide a protective cap that may be stacked onto other protective caps already installed onto a camera lens to provide additional layers of protection. It is still further an objective of the present disclosure to provide a protective cap that may be conveniently compressed for storage. It is still further an object of the present disclosure to provide a protective cap with a lint-resistant coating.

It is an objective of the present disclosure to provide a protective cap for a tubular-shaped object, where the protective cap comprises a substantially annular base member and a substantially annular sidewall extending rearwardly from the base member to thereby define a cavity for receiving an end of a tubular-shaped object.

It is further an objective of the present disclosure to provide a protective cap with a base member, where the base member is operable between a stretched position and an unstretched position such that the outermost diameter of the base member is variable to thereby accommodate any one of a plurality of tubular-shaped objects having different outermost diameters. It is still another objective of the present disclosure to provide a protective cap that is molded using a stretchable material. In an embodiment, the flexible material is silicone.

It is an objective of the present disclosure to provide a protective cap for tubular-shaped objects, where the outer surface of the protective cap has at least one first region and at least one second region, where the at least one first region has a first thickness, where the at least one second region has a second thickness, and where the first thickness is less than the second thickness such that the at least one first region is more stretchable than the second region and the second region provides more shock absorption that the first region due to its great thickness.

Referring now to FIG. 1, there is depicted a protective cap 100 according to an embodiment of the present disclosure. The protective cap 100 includes a base member 102. In an embodiment, the base member 102 has a substantially annular or disc shape and has an outer rim 104. The base member 102 has an outer surface 106 and an inner surface 108 (not visible, see FIG. 4).

Extending rearwardly from the outer rim 104 of the base member 102 is a sidewall 110. (A cross-section of the sidewall 110 is a substantially annular ring.) The sidewall 110 includes an outer surface 112 and an inner surface 114 (not visible; see FIG. 2). In an embodiment, the intersection of the base member 102 and the sidewall 110 along the outer rim 104 is at about 90 degrees. In other words, the base member 102 and the sidewall 110 are perpendicular to one another in an embodiment. As shown in FIG. 3, wherein like reference numeral depict like components, the outer rim 104 of the base member 102 is substantially annular.

Figure 2:
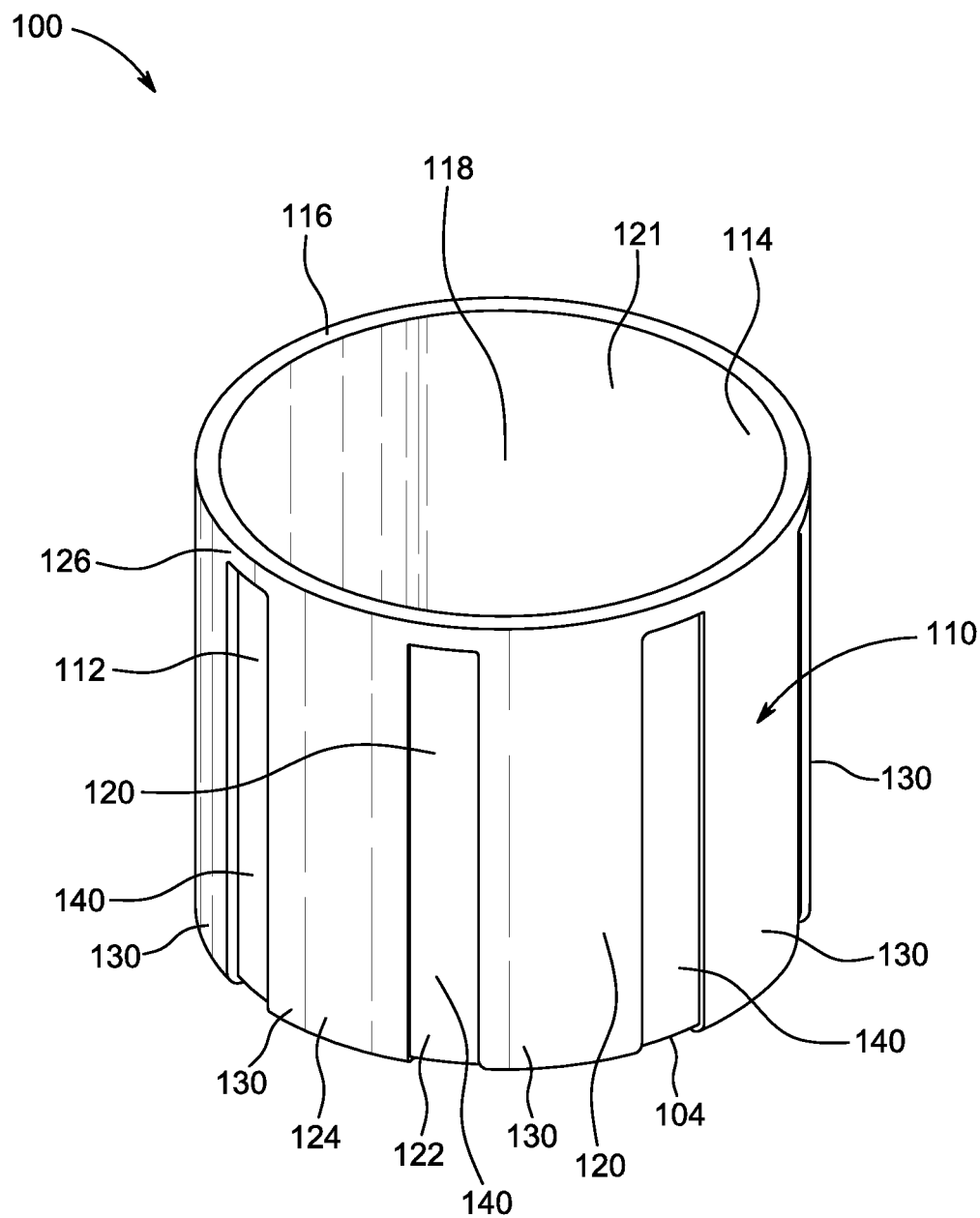
FIG. 2 is a bottom-down perspective view of the protective cap shown in FIG. 1.
Figure 3:
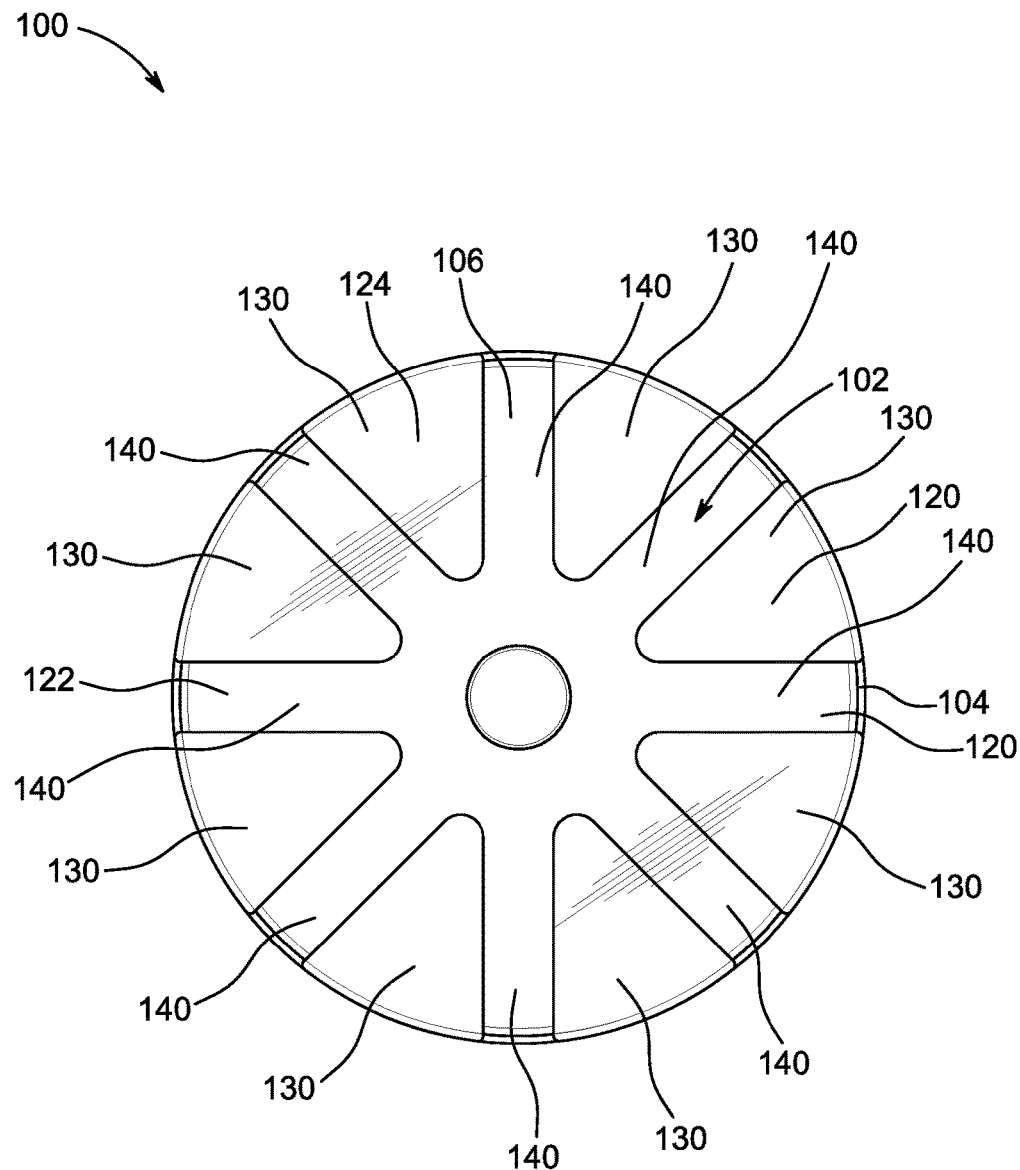
FIG. 3 is a top view of the protective cap shown in FIG. 1.

Referring now to FIG. 2, where like reference numerals depict like components, the sidewall 110 extends rearwardly and terminates at a terminal end 116. In an embodiment, the terminal end 116 is substantially planar. In other embodiments, the terminal end 116 is not substantially planar. The terminal end 116 may be substantially parallel to the base member 102. In an embodiment, the inner surface 114 of the sidewall 110 may be smooth.

Figure 4:
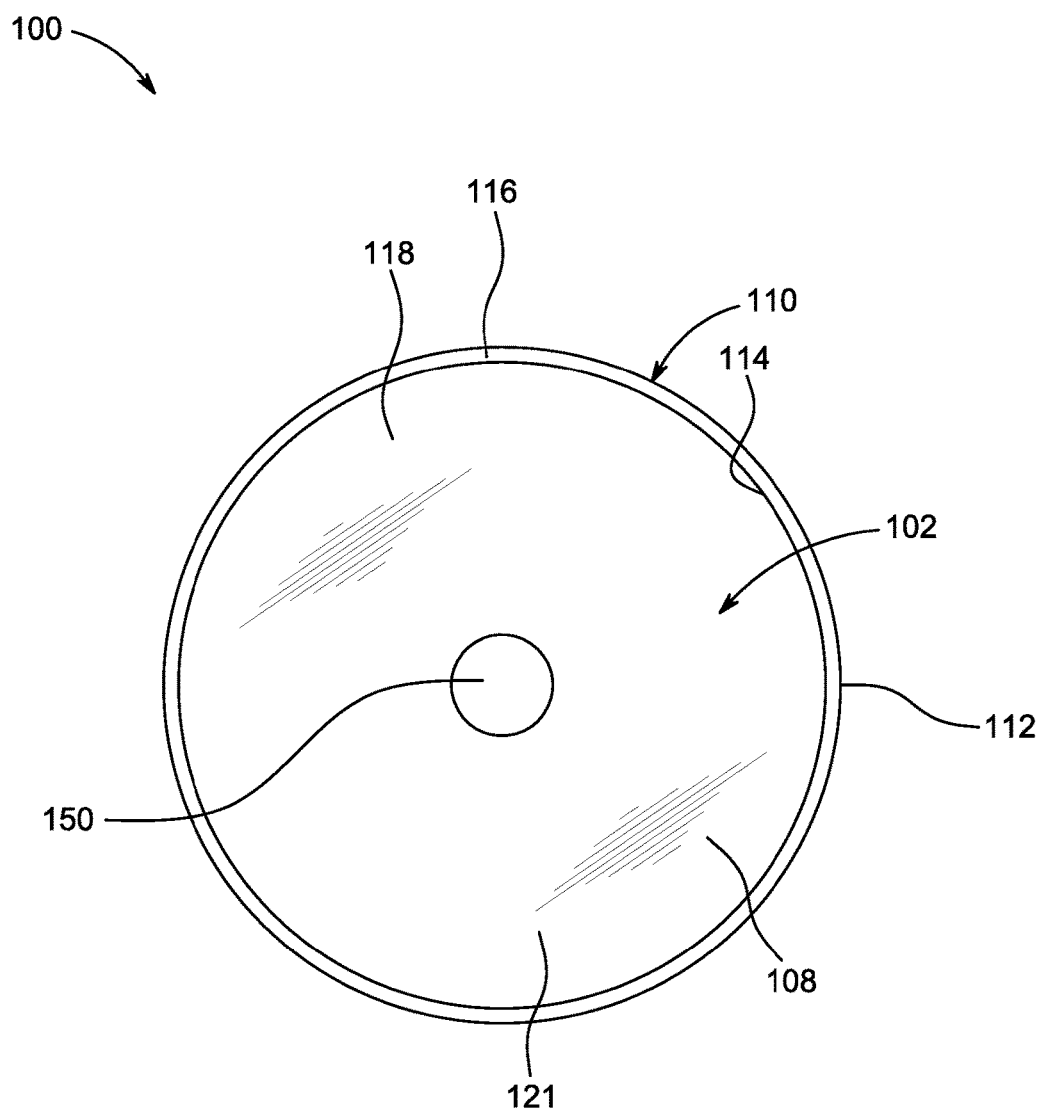
FIG. 4 is a bottom view of the protective cap shown in FIG. 1.
Figure 5:
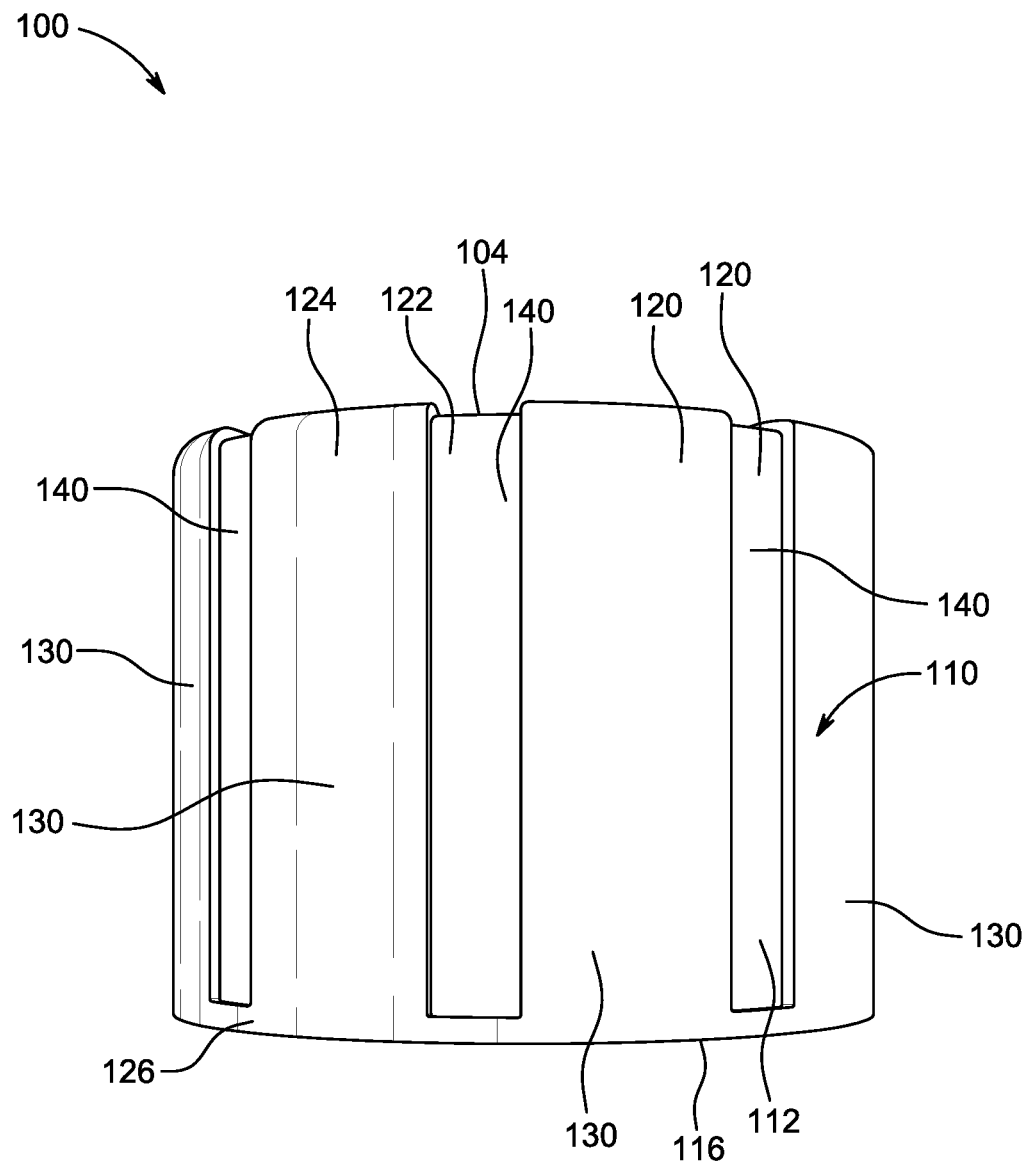
FIG. 5 is a side view of the protective cap shown in FIG. 1.
Figure 6:
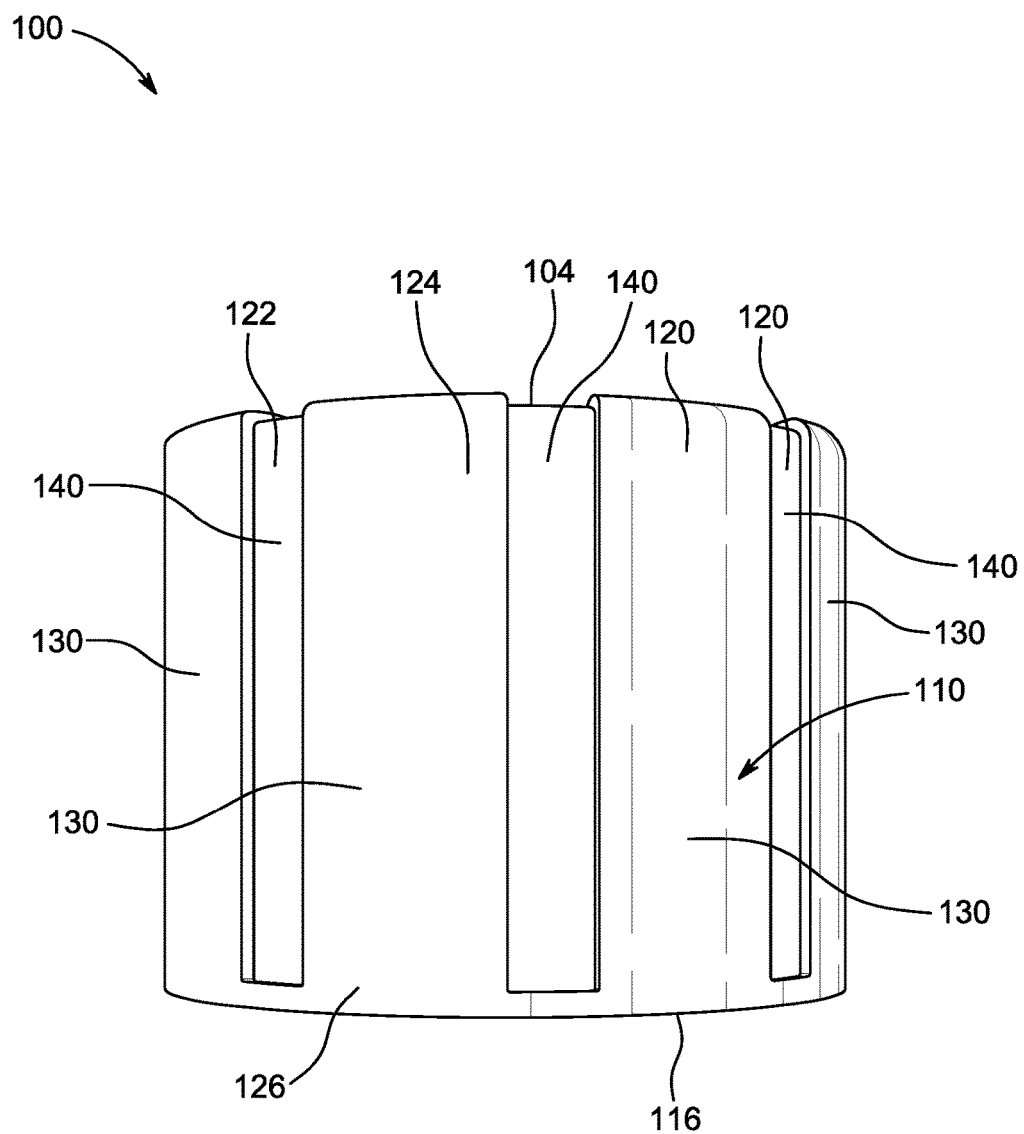
FIG. 6 is a side view of the protective cap shown in FIG. 1.

Referring now to FIGS. 2 and 4, where like reference numerals depict like components, the inner surface 114 of the sidewall 110 and the inner surface 108 of the base member 102 define a cavity 118 for receiving an end of a tubular object, such as a camera lens. The terminal end 116 and the sidewall 110 may expand radially outward to accommodate a wide range of diameters of tubular objects. As will be explained in more detail hereinafter, the base member 102 may be expandable as well.

Referring now to FIGS. 1, 2, 3, 5 and 6, where like reference numerals depict like components, the outer surface 106 of the base member 102 and the outer surface 112 of the sidewall 110 together form a contiguous outer surface 120 for the protective cap 100. Referring back to FIGS. 2 and 4, the inner surface 108 of the base member 102 and the inner surface 114 of the sidewall 110 together form a contiguous inner surface 121.

Formed on the contiguous outer surface 120 of the protective cap 100 is a first region 122 and a second region 124. In an embodiment, the first region 122 has a first thickness and the second region 124 has a second thickness. (The first thickness and the second thickness are defined as the width between the contiguous inner surface 121 and the contiguous outer surface 120.)

In an embodiment, the first thickness is less than the second thickness. Stated another way, the wall of the first region 122 is thinner than the wall of the second region 124. It will be appreciated that because the wall of the first region 122 is thinner than the wall of the second region 124, that the first region 122 is more easily stretched as compared to the second region 124. That is, when placed under the same tensile stress, the first region 122 will stretch more than the second region 124. But, it will be appreciated that because the second region 124 is thicker that it provides greater protection from shocks and impacts than the first region 122. It will be appreciated that the use of a material with different thicknesses to form the protective cap 100 provides the ability of the cap 100 to more easily stretch to fit lenses of varying diameters while at the same time providing an improved shock absorbent feature. Moreover, the thickness of the second region 124 provides improved durability and tear resistance to the protective cap 100.

Referring to FIGS. 1, 2, 5 and 6, the second region 124 comprises a rim 126 that extends around the outer surface 112 of the sidewall 110 adjacent the terminal end 116. The second region 124 further comprises a plurality of bumper portions 130 extending forwardly from the rim 126, along the sidewall 110, through the outer rim 104, and onto the base member 102. Each of the bumper portions 130 may terminate at a wedge or tapered shape 132 on the base member 102 as shown in FIG. 1. Although the bumper portions 130 and the rim 126 of the second region 124 are shown connected, it will be appreciated that they may be separate from each other. As further shown in FIG. 1, the first region 122 and the second region 124 are separated by an edge 134 due to their different thicknesses.

As shown in FIG. 1, the outer surface 106 of the base member 102 includes a third region 136. The third region 136 may be generally cylindrical in shape and have a thickness greater than the thickness of the surrounding first region 122. In an embodiment, the third region 136 and the second region 124 may have the same thickness. In another embodiment, the first, second and third regions 122, 124 and 136 may all have different thicknesses. The third region 136 may also operate as a bumper to provide protection to a lens from shocks and impacts.

The first region 122 may comprise a plurality of stretch channels 140 disposed between the bumper portions 130. The stretch channels 140 may extend forwardly from the rim 126, past the outer rim 104, and onto the base member 102. The stretch channels 140 may extend radially inward on the base member 102 in a spoke and wheel configuration where the third region 136 is the hub. In an embodiment, the stretch channels 140 may be separate from each other such that they do not intersect. It will be appreciated that the placement of the stretch channels 140 on the sidewall 110 allows the sidewall 110 to expand radially outward. At the same time, the stretch channels 140 on the base member 102 allow the outer rim 104 of the base member 102 to expand radially outward.

In an embodiment, the thickness of the first region 122 is about 1.5 mm while a thickness of the second region is about 2.0 mm. Thus, the thickness of the first region 122 may be about 75% the thickness of the second region 124. In different embodiments, the thickness of the first region 122 may be between 50% and 95% of the thickness of the second region 124. In still different embodiments, the difference in thickness between the first region 122 and the second region 124 is between 0.3 and 2.0 mm. In an embodiment, the thickness of the first region 122 is between 0.3 and 3.0 mm. In an embodiment, the thickness of the second region 124 is between 1.5 and 3.0 mm. In an embodiment, the height of the edge 134 is about 0.5 mm. In another embodiment, the height of the edge 134 is between 0.3 and 2.0 mm. As used herein, the term "about" means within 10%.

Referring back to FIG. 4, disposed on the inner surface 108 of the base member 102 is a protrusion 150. The protrusion 150 may extend between 1.5 and 3.0 mm from the inner surface 108 of the base member 102. It will be appreciated that the protrusion 150 is operable to protect an optical lens to prevent scratching by operating as a bumper between the inner surface 108 and the optical lens.

Figure 8A:
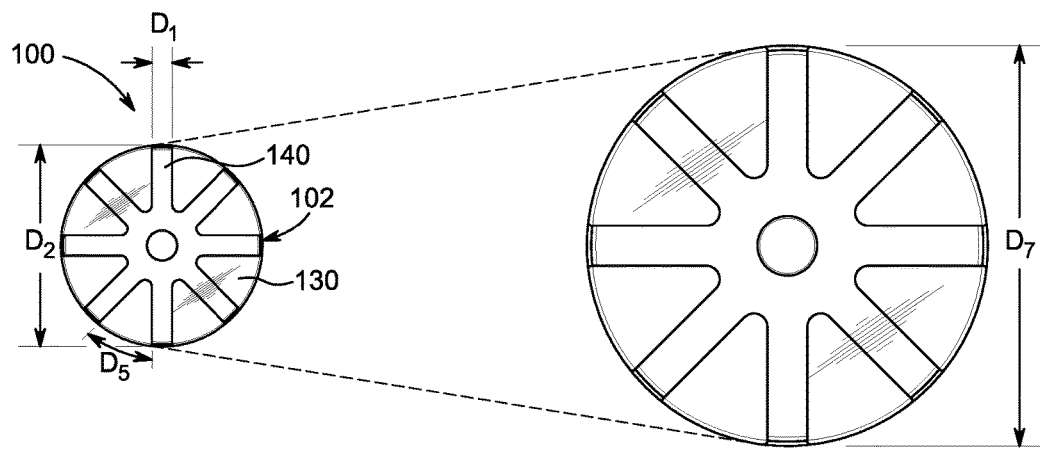
FIGS. 8A-8C show the stretchability of the protective cap shown in FIG. 1.
Figure 8B:
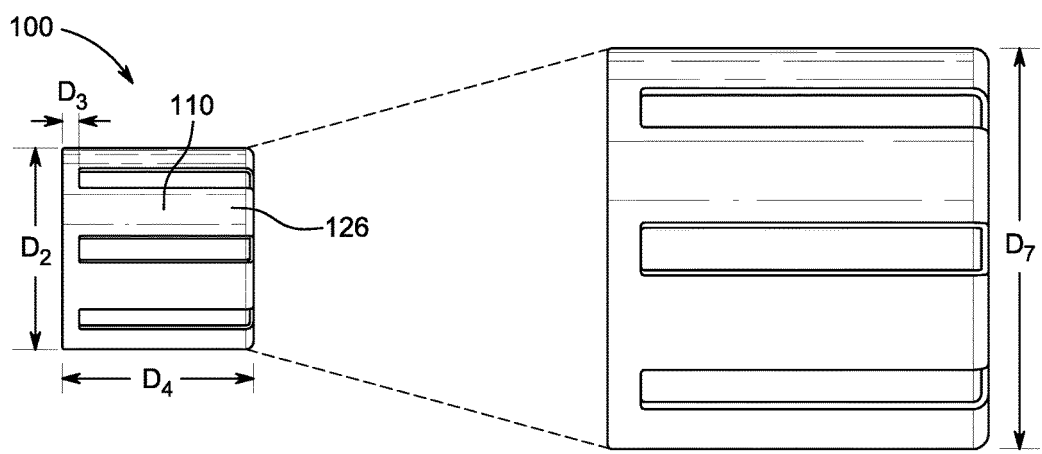
Figure 8C:
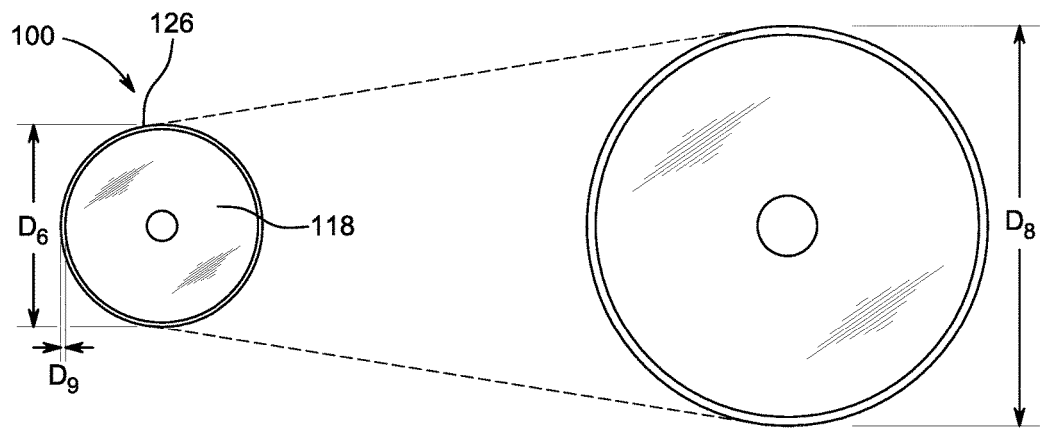

Referring now to FIG. 8A-8C, various dimensions of the protective cap 100 in the unstretched (left side) and stretched (right side) positions are shown. Exemplary values for these dimensions are disclosed by the ranges in Table 1, below, according to an embodiment of the present disclosure.

TABLE 1

| $D_x$ | Description | MM |
|---|---|---|
| $D_1$ | Channel (140) Unstretched Width | 5-10 mm |
| $D_2$ | Base Member (102) Unstretched Outer Diameter | 52-68 mm |
| $D_3$ | Rim (126) Unstretched Length | 2-6 mm |
| $D_4$ | Sidewall (110) Unstretched Length | 50-60 mm |
| $D_5$ | Bumper (130) Unstretched Width | 6-12 mm |
| $D_6$ | Cavity (118) Unstretched Inner Diameter | 50-68 mm |
| $D_7$ | Base Member (102) Stretched Outer Diameter | 62-162 mm |
| $D_8$ | Cavity (118) Stretched Inner Diameter | 60-160 mm |
| $D_9$ | Rim (126) Thickness | 1.5-3 mm |

It will be appreciated that the dimensions in Table 1 are exemplary only and that other dimensions are contemplated by the present invention.

In an embodiment, the protective cap 100 is molded from a flexible material. In an embodiment, the flexible material is silicone. In an embodiment, the protective cap 100 includes a lint-resistant coating. In an embodiment, the lint-resistant coating is comprised of silicon dioxide.

Figure 7:
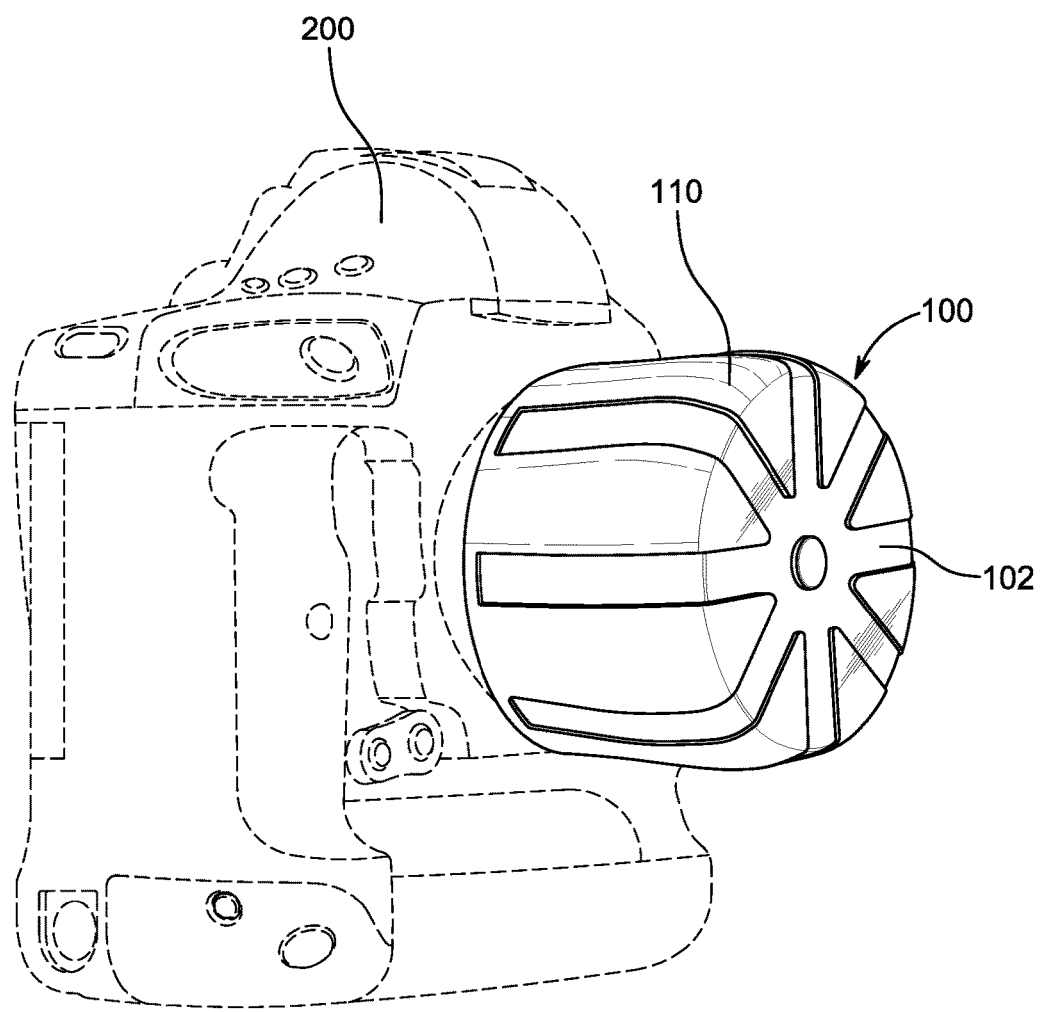
FIG. 7 depicts the protective cap shown in FIG. 1 installed onto a lens of a camera.

Referring now to FIG. 7, the protective cap 100 is installable onto a lens of a camera. To install the protective cap 100, a user stretches the sidewall 110 over the lens and then slides the lens into the cavity 118. The first region 122 of the cap 100 stretches to accommodate the lens. The second region 124 of the cap 100 also expands but perhaps not as much as the first region 122 due to its greater thickness.

It will be appreciated that while the protective cap 100 is installable onto an end of most any tubular-shaped object, that the present invention is particularly suited for optical equipment. In an embodiment, the tubular-shaped object is one of a camera lens, video camera lens, telescope, binocular, optical instruments, tools and other optical devices with substantially tubular housings. In an embodiment, the tubular-shaped object is a tube, such as a cardboard tube, metal tube or plastic tube. In an embodiment, the tubular-shaped object is a housing. It will be appreciated that a single protective cap 100 may be installed onto the ends of tubular-shaped objects having varying diameters. In this regard, the protective cap 100 may be considered a "universal" cap.

It will be further appreciated that the protective cap 100 is suitable for use in photography, where the protective cap 100 may be installed on lenses of different diameters and sizes. In this regard, the protective cap 100 eliminates the need for photographers to have separately sized lens caps. Instead, the protective cap 100 disclosed herein is able to fit over most all of a photographer's lenses. In addition, the protective cap 100 disclosed herein is able to be installed onto both ends of a detached lens.

It will be appreciated that the bumpers 130 of the protective cap 100 provide improved protection for lenses from damage caused by shocks and impacts. In this regard, the protective cap 100 provides the bumpers 130 to better protect lenses by providing a shock absorbent feature. In addition, it will be appreciated that the protective cap 100 provides improved protection for lenses from damage caused by water and dust. In this regard, when installed, the protective cap 100 may provide waterproof protection to a lens. In addition, the protective cap 100 prevents dust and other debris from damaging the actual lens.

It will be appreciated that the protective cap 100 will not fall off a lens under almost any circumstance. In this regard, the inner surface 114 of the sidewall 110 of the protective cap 100 securely engages the barrel of a camera lens by a compression and friction fit. Protective caps 100 may be installed onto both the front and rear ends of a detachable camera lens such that the sidewalls 110 of the caps 100 overlap. The protective cap 100 stretches to accommodate camera lenses having a diameter of about 60 mm to 160 mm.

In an embodiment, the protective cap 100 may be stackable one on top of another. That is, one or more protective caps 100 may be installed onto a protective cap 100 already installed onto a camera lens to provide additional protection from damage. The protective cap 100 may be conveniently compressed for storage. In this regard, the protective cap 100 is unbreakable due to its flexible nature. The protective cap 100 may incorporate a lint-resistant coating, especially on the inner surface 108 of the base member 102. In an embodiment, the lint-resistant coating is silicon dioxide.

It will be further appreciated that the protective cap 100 may have a first region and a second region formed therein, where the first region is more stretchable than the second region. In this manner, the protective cap 100 is able to stretch over tubular objects of varying diameters via the thinner first region while still being able to provide improved shock absorbency via of the thicker second region.

It is an object of the present disclosure to provide protective cap for tubular-shaped objects, each of the tubular-shaped objects having an outermost diameter, the outermost diameters of each of the tubular-shaped objects being different from one another, said protective cap comprising: a base member having an outer surface, an inner surface, and an outermost diameter; a sidewall extending rearwardly from the base member, the sidewall having an outer surface and an inner surface; wherein the inner surface of the sidewall and the inner surface of base member together define a cavity for receiving an end of one of the tubular-shaped objects; wherein the base member is operable between a stretched position and an unstretched position to thereby vary its outermost diameter to accommodate the varying outermost diameters of each of the tubular-shaped objects.

It is further an objective of the present disclosure to provide a protective cap that comprises a flexible material, where the flexible material is silicone. It is still a further objective of the present disclosure to provide a protective cap wherein the sidewall and the base member intersect at approximately a 90-degree angle. It is still a further objective of the present disclosure to provide a protective cap where the outermost diameter of the base member is variable by one of: at least 50 mm, at least 60 mm, at least 70 mm.

It is still a further objective of the present disclosure to provide a protective cap with an outer surface, where the outer surface of the base member comprises at least one bumper and at least one stretch channel, where a thickness of the at least one bumper is greater than a thickness of the at least one stretch channel. It is still further an objective of the present disclosure to provide a protective cap with a plurality of stretch channels. It is still further an objective of the present disclosure to provide a protective cap with a plurality of stretch channels, where the stretch channels are arranged in a spoke and wheel configuration. It is still a further objective to provide a protective cap with a sidewall with an outer surface, where the outer surface of the sidewall comprises at least one bumper and at least one stretch channel, wherein a thickness of the at least one stretch channel is less than a thickness of the at least one bumper.

It is an objective of the present disclosure to provide a protective cap for tubular-shaped objects, the protective cap comprising a base member having an outer surface and an inner surface; a sidewall extending rearwardly from the base member, the sidewall having an outer surface and an inner surface; wherein the inner surface of the sidewall and the inner surface of the base member define a cavity for receiving an end of a tubular-shaped object; wherein the outer surface of the base member and the outer surface of the sidewall define a contiguous outer surface; wherein the contiguous outer surface has at least one bumper and at least one stretch channel; wherein the at least one stretch channel has a first thickness; wherein the at least one bumper has a second thickness; wherein the first thickness is less than the second thickness. It is further an objective of the present disclosure to provide the aforementioned protective cap, where a difference between the first thickness and the second thickness is between 0.3 and 2.0 millimeters or about 0.5 millimeters. It is further an objective of the present disclosure to provide the aforementioned protective cap, where the first thickness is between 1.0 and 3.0 millimeters and the second thickness is between 1.5 and 3.5 millimeters. It is further an objective of the present disclosure to provide the aforementioned protective cap, where the first thickness is about 1.5 millimeters and the second thickness is about 2.0 millimeters. It is further an objective of the present disclosure to provide the aforementioned protective cap, where the cap comprises an annular rim around the sidewall. It is further an objective of the present disclosure to provide the aforementioned protective cap, where the sidewall comprises a terminal end, wherein the annular rim is adjacent the terminal end. It is further an objective of the present disclosure to provide the aforementioned protective cap, where a plurality of bumpers extend forwardly on the sidewall from the annular rim, wherein the bumpers are interconnected with the annular rim. It is further an objective of the present disclosure to provide the aforementioned protective cap, where a stretch channel is interposed between each of the bumpers, where a thickness of the stretch channel is thinner than a thickness of the bumpers.

It is an objective of the present disclosure to provide a protective cap for tubular-shaped objects, said protective cap comprising: a base member having an outer surface and an inner surface; a sidewall extending rearwardly from the base member, the sidewall having an outer surface and an inner surface; wherein the inner surface of the sidewall and the inner surface of the base member define a cavity for receiving an end of a tubular-shaped object; and a lint-resistant coating on the protective cap. It is further an objective of the present disclosure to provide the aforementioned protective cap, where the lint-resistant coating comprises silicon dioxide. It is further an objective of the present disclosure to provide the aforementioned protective cap, where the lint-resistant coating is disposed on the inner surface of the base member. It is further an objective of the present disclosure to provide the aforementioned protective cap, where the protective cap is formed of a molded flexible material. It is further an objective of the present disclosure to provide the aforementioned protective cap, where the flexible material is silicone.

It is further an objective of the present disclosure to provide a method of protecting a camera lens from damage, said method comprising: providing a protective cap; installing the protective cap onto the camera lens by stretching the protective cap to fit over an end of the camera lens; wherein the protective cap comprises a base member and a sidewall, the sidewall extending rearwardly from the base member; wherein the protective cap comprises an outer surface having at least one bumper and at least one stretch channel formed thereon, wherein a thickness of the at least one stretch channel is less than a thickness of the at least one bumper. It is further an objective of the present disclosure to provide the aforementioned method, where the protective cap comprises silicone. It is further an objective of the present disclosure to provide the aforementioned method, where the at least one bumper and the at least one stretch channel are formed on the base member. It is further an objective of the present disclosure to provide the aforementioned method, where the at least one bumper and the at least one stretch channel are formed on the sidewall. It is further an objective of the present disclosure to provide the aforementioned method, where the at least one bumper and at least one stretch channel are formed on the base member and the sidewall. It is further an objective of the present disclosure to provide the aforementioned method, further comprising installing a second protective cap on top of the protective cap already installed onto the camera lens.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A protective cap for tubular-shaped objects, said protective cap comprising:
    a base member having an outer surface and an inner surface;
    a sidewall extending rearwardly from the base member, the sidewall having an outer surface and an inner surface;
    wherein the inner surface of the sidewall and the inner surface of the base member define a cavity for receiving an end of a tubular-shaped object;
    wherein the outer surface of the base member and the outer surface of the sidewall define a contiguous outer surface;
    wherein the contiguous outer surface has at least one bumper and at least one stretch channel;
    wherein the at least one stretch channel has a first thickness;
    wherein the at least one bumper has a second thickness;
    wherein the first thickness is less than the second thickness;
    wherein a difference between the first thickness and the second thickness is between 0.3 and 2.0 millimeters.

2. The protective cap of claim 1, wherein a difference between the first thickness and the second thickness is about 0.5 millimeters.

3. The protective cap of claim 1, wherein the first thickness is between 1.0 and 3.0 millimeters.

4. The protective cap of claim 3, wherein the second thickness is between 1.5 and 3.5 millimeters.

5. The protective cap of claim 1, wherein the first thickness is about 1.5 millimeters and the second thickness is about 2.0 millimeters.

6. The protective cap of claim 1, further comprising an annular rim around the sidewall.

7. The protective cap of claim 6, wherein the sidewall comprises a terminal end, wherein the annular rim is adjacent the terminal end.

8. The protective cap of claim 7, further comprising a plurality of bumpers extending forwardly on the outer surface of the sidewall from the annular rim, wherein each of the plurality of bumpers are interconnected with the annular rim.

9. The protective cap of claim 8, further comprising a stretch channel interposed between adjacent ones of the plurality of bumpers, wherein a thickness of the stretch channel is thinner than a thickness of the plurality of bumpers.

10. The protective cap of claim 1, wherein the at least one bumper and at least one stretch channel are separated by an edge.

11. A method of protecting a camera lens from damage, said method comprising:
    providing a protective cap;
    installing the protective cap onto the camera lens by stretching the protective cap to fit over an end of the camera lens;
    wherein the protective cap comprises a base member and a sidewall, the sidewall extending rearwardly from the base member;
    wherein the protective cap further comprises an outer surface having at least one bumper and at least one stretch channel formed thereon, wherein a thickness of the at least one stretch channel is less than a thickness of the at least one bumper; and
    further comprising installing a second protective cap on top of the protective cap already installed onto the camera lens.

12. The method of claim 11, wherein the protective cap comprises silicone.

13. The method of claim 11, wherein the at least one bumper and the at least one stretch channel are formed on the base member.

14. The method of claim 11, wherein the at least one bumper and the at least one stretch channel are formed on the sidewall.

15. The method of claim 11, wherein the at least one bumper and at least one stretch channel are formed on the base member and the sidewall.

16. A protective cap for tubular-shaped objects, said protective cap comprising:
    a base member having an outer surface and an inner surface;
    a sidewall extending rearwardly from the base member, the sidewall having an outer surface and an inner surface;

wherein the inner surface of the sidewall and the inner surface of the base member define a cavity for receiving an end of a tubular-shaped object;

wherein the outer surface of the base member and the outer surface of the sidewall define a contiguous outer surface;

wherein the contiguous outer surface has at least one bumper and at least one stretch channel;

wherein the at least one stretch channel has a first thickness;

wherein the at least one bumper has a second thickness;

wherein the first thickness is less than the second thickness;

wherein the first thickness is between 1.0 and 3.0 millimeters.

17. The protective cap of claim 16, wherein a difference between the first thickness and the second thickness is between 0.3 and 2.0 millimeters.

18. The protective cap of claim 16, wherein a difference between the first thickness and the second thickness is about 0.5 millimeters.

19. The protective cap of claim 18, wherein the second thickness is between 1.5 and 3.5 millimeters.

20. The protective cap of claim 16, wherein the first thickness is about 1.5 millimeters and the second thickness is about 2.0 millimeters.

21. The protective cap of claim 16, further comprising an annular rim around the sidewall.

22. The protective cap of claim 21, wherein the sidewall comprises a terminal end, wherein the annular rim is adjacent the terminal end.

23. The protective cap of claim 22, further comprising a plurality of bumpers extending forwardly on the sidewall from the annular rim, wherein each the bumpers are interconnected with the annular rim.

24. The protective cap of claim 23, further comprising a stretch channel interposed between each of the bumpers, wherein a thickness of the stretch channel is thinner than a thickness of the bumpers.

25. The protective cap of claim 16, wherein the at least one bumper and at least one stretch channel are separated by an edge.

26. A protective cap for tubular-shaped objects, said protective cap comprising:

a base member having an outer surface and an inner surface;

a sidewall extending rearwardly from the base member, the sidewall having an outer surface and an inner surface;

wherein the inner surface of the sidewall and the inner surface of the base member define a cavity for receiving an end of a tubular-shaped object;

wherein the outer surface of the base member and the outer surface of the sidewall define a contiguous outer surface;

wherein the contiguous outer surface has at least one bumper and at least one stretch channel;

wherein the at least one stretch channel has a first thickness;

wherein the at least one bumper has a second thickness;

wherein the first thickness is less than the second thickness;

wherein the first thickness is about 1.5 millimeters and the second thickness is about 2.0 millimeters.

27. The protective cap of claim 26, further comprising an annular rim around the sidewall.

28. The protective cap of claim 26, wherein the sidewall comprises a terminal end, wherein the annular rim is adjacent the terminal end.

29. The protective cap of claim 28, further comprising a plurality of bumpers extending forwardly on the sidewall from the annular rim, wherein each the bumpers are interconnected with the annular rim.

30. The protective cap of claim 29, further comprising a stretch channel interposed between each of the bumpers, wherein a thickness of the stretch channel is thinner than a thickness of the bumpers.

31. The protective cap of claim 26, wherein the at least one bumper and at least one stretch channel are separated by an edge.

* * * * *